United States Patent
Chiproot

(10) Patent No.: US 9,835,277 B2
(45) Date of Patent: Dec. 5, 2017

(54) AXIAL-RESTRAINT PIPE COUPLING WITH INDIVIDUAL GRIP ELEMENTS

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 52 days.

(21) Appl. No.: 14/964,634

(22) Filed: Dec. 10, 2015

(65) Prior Publication Data

US 2017/0167646 A1 Jun. 15, 2017

(51) Int. Cl.
*F16L 3/00* (2006.01)
*F16L 21/06* (2006.01)

(52) U.S. Cl.
CPC ............. *F16L 21/065* (2013.01); *F16L 3/00* (2013.01)

(58) Field of Classification Search
CPC .............................. F16L 21/007; F16L 21/065
USPC .................................. 285/420, 342, 343, 373
See application file for complete search history.

(56) References Cited

U.S. PATENT DOCUMENTS

| | | | | |
|---|---|---|---|---|
| 4,050,720 A * | 9/1977 | Reneau | ................... | F16L 41/06 285/373 |
| 4,621,844 A * | 11/1986 | Kipp | ...................... | F16L 25/00 285/421 |
| 4,807,912 A * | 2/1989 | Maier | ..................... | F16L 21/08 285/373 |
| 5,947,529 A * | 9/1999 | Jensen | .................. | F16L 21/007 285/363 |
| 6,106,029 A * | 8/2000 | DeMore | .................. | F16L 21/08 285/348 |
| 6,843,514 B2 * | 1/2005 | Rex | ......................... | F16L 21/08 285/343 |
| 7,571,940 B2 * | 8/2009 | Krausz | .................. | F16L 21/022 285/343 |
| 7,837,238 B2 * | 11/2010 | Krausz | .................. | F16L 19/065 285/343 |
| 9,528,641 B2 * | 12/2016 | Chiproot | ................. | F16L 21/08 |
| 2007/0296213 A1 * | 12/2007 | Jones | ..................... | F16L 25/12 285/373 |
| 2010/0176588 A1 | 7/2010 | Chiproot | | |
| 2012/0025524 A1 * | 2/2012 | Krausz | .................. | F16L 21/08 285/420 |
| 2016/0033066 A1 * | 2/2016 | Patriarca | ............... | F16L 25/065 285/342 |

OTHER PUBLICATIONS

PCT Search Report and Written Opinion PCT/IB2016/057413, dated Apr. 4, 2017.

* cited by examiner

*Primary Examiner* — David E Bochna
(74) *Attorney, Agent, or Firm* — Dekel Patent Ltd.; David Klein

(57) ABSTRACT

A pipe coupling includes an annular seal disposed in an annular clamp housing, which has an opening for inserting therein a pipe and which includes clamp members and tightening elements operative to fasten and tighten the clamp members towards each other in a direction transverse to an axial length of the annular clamp housing so as to apply a radially-inward clamping force on the pipe. Grip elements are located about an inner perimeter of the opening. Each of the grip elements includes a static wedge, which is fixed to the annular clamp housing, and a movable wedge, which is covered by a grip member having gripping teeth, arranged to slide axially relative to the static wedge.

4 Claims, 3 Drawing Sheets

FIG. 4

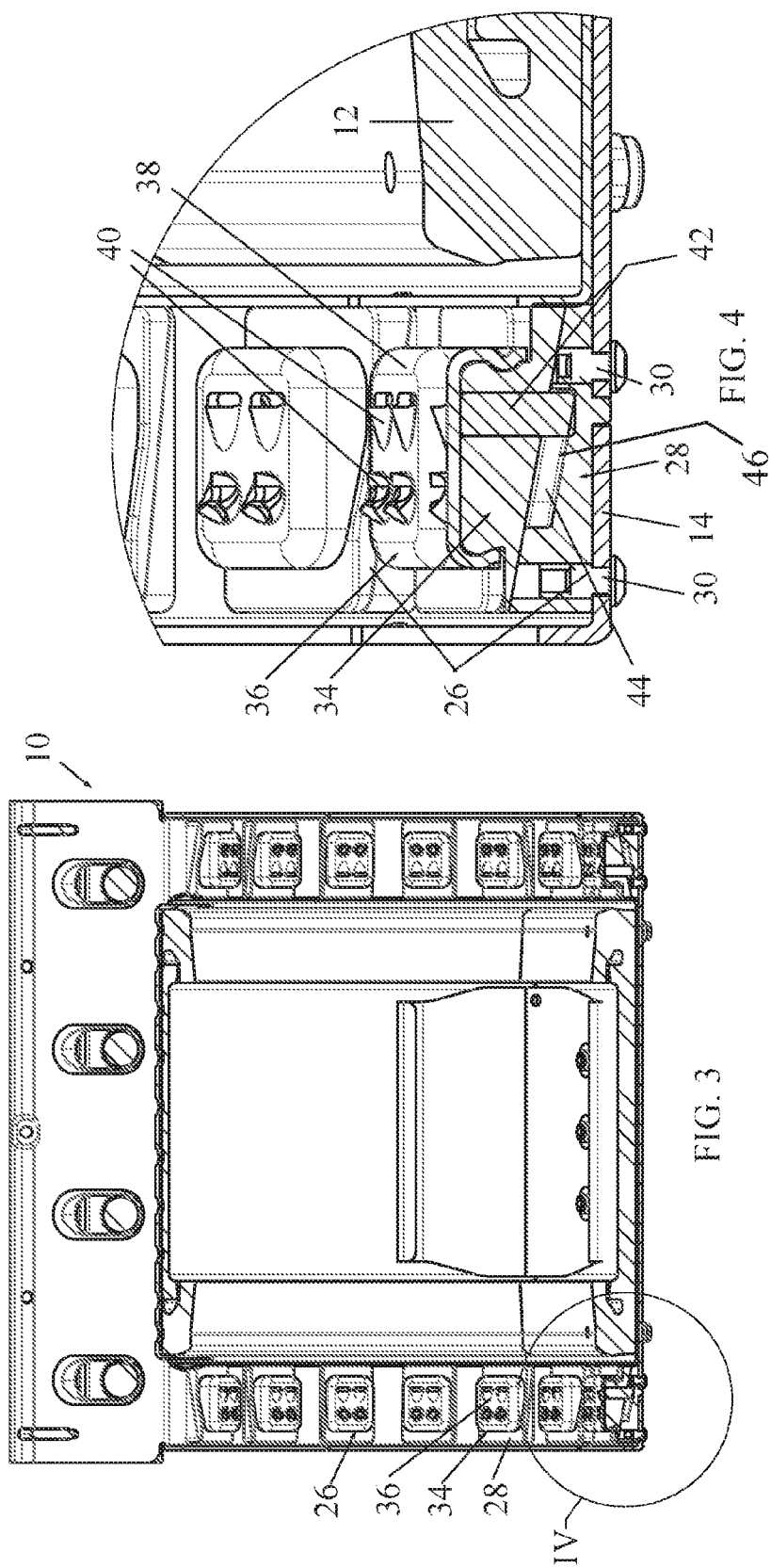

AXIAL-RESTRAINT PIPE COUPLING WITH INDIVIDUAL GRIP ELEMENTS

FIELD OF THE INVENTION

The present invention relates generally to pipe couplings, and particularly to an axial-restraint pipe coupling with individual grip elements.

BACKGROUND OF THE INVENTION

Many kinds of removable band-type couplings for pipes exist in the art. It is noted that throughout the specification and claims, the term "pipe" encompasses any kind of generally cylindrical object.

In general, pipe couplings have an elastomeric seal member, and when the coupling is tightened, the seal member seals against the outer contour of two pipes inserted in the coupling. Due to hydraulic forces caused by liquid flowing in the pipes, as well as other factors, the pipe coupling is subject to axial forces that tend to make the coupling shift axially along the pipes. Accordingly, manufacturers have developed different axial-restraint pipe couplings, which have different mechanisms for counteracting the axial forces on the coupling.

For example, U.S. Pat. No. 7,571,940 to Krausz describes a pipe coupling that combines an elastomeric seal member with a grip ring. The grip ring is formed of wedge-shaped grip elements that are radially spaced from one another about a ring member, such as springs that connect adjacent grip rings with one another. The grip elements are formed with teeth that face inwards towards the center of the ring. A single fastener (e.g., bolt and nut or other tightenable screw) is provided, which when tightened in a direction transverse to the axial length of the pipe, presses both the elastomeric seal member and the grip ring against the surface of the pipe. The teeth of the grip ring act against the axial forces.

U.S. Pat. No. 6,851,728 describes a pipe coupling with an externally-threaded joint body, a locknut, an annular core member disposed within the locknut, and a plurality of locking members retained in apertures of the core member to be spaced circumferentially apart from each other. Upon tightening rotation of the locknut around the joint body, the internal conical surface of the locknut slidably contacts with the conical surfaces of the locking members so as to press the locking members radially inwardly, to cause the gripping portions of the locking members come into gripping engagement with the outer periphery of the inserted pipe, to act against axial forces.

SUMMARY OF THE INVENTION

The present invention seeks to provide an improved axial-restraint pipe coupling with individual grip elements, as is described more in detail hereinbelow. In the prior art couplings with grip rings, all of the grip elements move in unison. In contrast, in the present invention, each grip element is a wedge that moves and wedges against the pipe being clamped entirely independently of any other grip element. This may provide superior resistance to axial forces in certain situations of unequal axial pull-out forces.

There is thus provided in accordance with an embodiment of the present invention a pipe coupling including a pipe coupling including an annular seal disposed in an annular clamp housing, which has an opening for inserting therein a pipe and which includes clamp members and tightening elements operative to fasten and tighten the clamp members towards each other in a direction transverse to an axial length of the annular clamp housing so as to apply a radially-inward clamping force on the pipe, and a plurality of grip elements located about an inner perimeter of the opening, each of the grip elements including a static wedge, which is fixed to the annular clamp housing, and a movable wedge, which is covered by a grip member having gripping teeth, arranged to slide axially relative to the static wedge.

In accordance with an embodiment of the present invention the movable wedge includes a retaining member, which limits axial travel of the movable wedge.

In accordance with an embodiment of the present invention the retaining member is constrained to travel in a groove formed in the static wedge.

In accordance with an embodiment of the present invention the static wedge is mounted on a rigid base fixed to the annular clamp housing. Alternatively, the static wedge may be mounted directly on the annular clamp housing.

In accordance with an embodiment of the present invention the grip member has a sloped surface on which large and small teeth are formed.

BRIEF DESCRIPTION OF THE DRAWINGS

The present invention will be understood and appreciated more fully from the following detailed description, taken in conjunction with the drawing in which:

FIG. 3 is a simplified partially sectional illustration of the pipe coupling, showing the individual grip elements, taken along lines III-III in FIG. 2; and FIG. 4 is an enlarged view of the grip elements shown in FIG. 3.

DETAILED DESCRIPTION OF EMBODIMENTS

Figure 1:
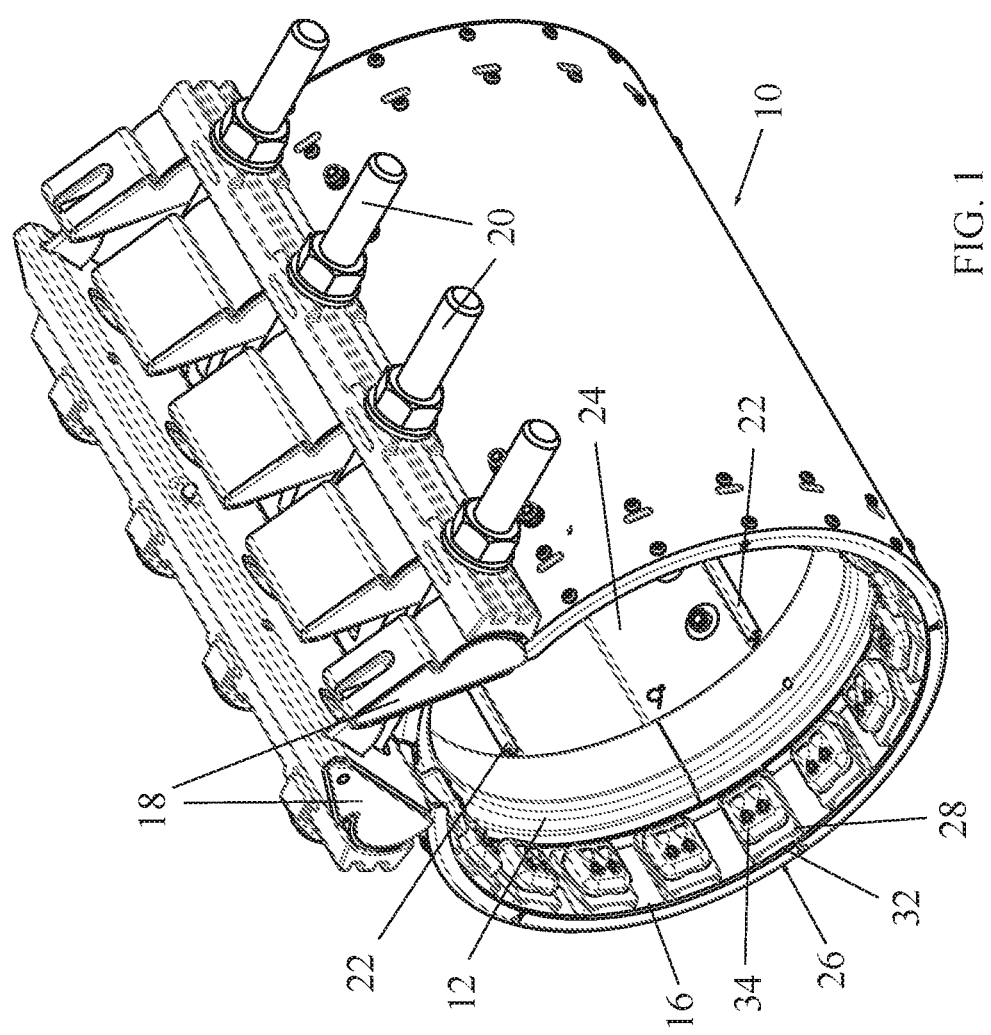
FIG. 1 is a simplified pictorial illustration of a pipe coupling, constructed and operative in accordance with an embodiment of the present invention.
Figure 2:
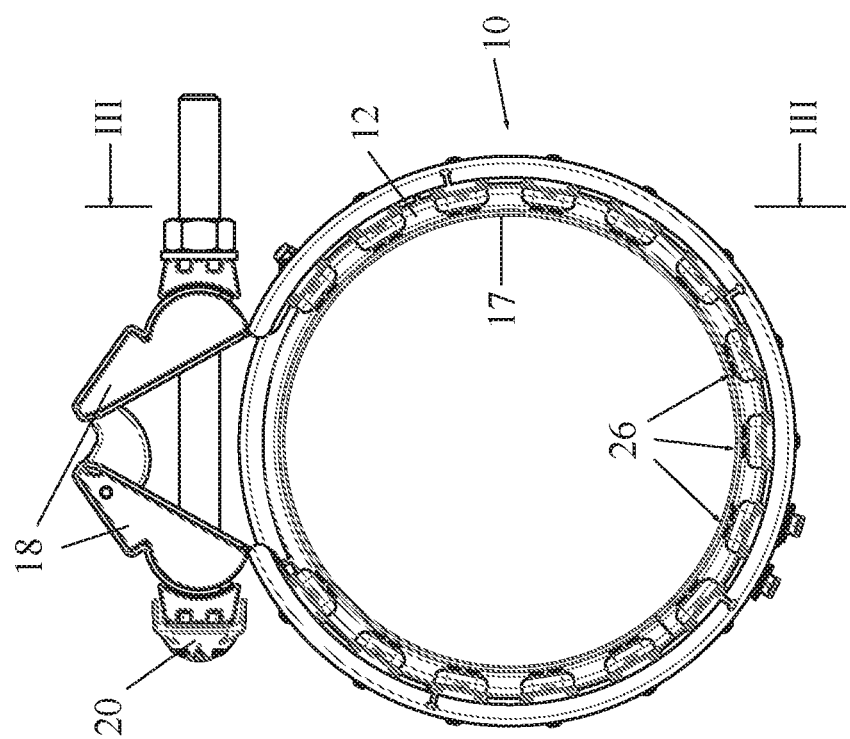
FIG. 2 is a simplified end-view of the pipe coupling.

Reference is now made to FIGS. 1 and 2, which illustrate a pipe coupling 10, constructed and operative in accordance with a non-limiting embodiment of the present invention.

Pipe coupling 10 includes an annular seal 12 disposed in an annular clamp housing 14. Annular clamp housing 14 has an opening 16 for inserting therein a pipe 17 (shown in FIG. 2). Annular clamp housing 14 has two clamp members 18 and tightening elements 20 (e.g., one or more mechanical fasteners, such as a bolt or screw and a tightening nut, and possibly washer) that fasten and tighten clamp members 18 towards each other in a direction transverse to the axial length of annular clamp housing 14 so as to apply a radially-inward clamping force on pipe 17.

Annular seal 12, which may be made of a natural or artificial elastomeric material, is radially squeezed and sealingly clamped against the outside surface of the pipe 17 when tightening elements 20 fasten and tighten clamp members 18 towards each other. Annular seal 12 may include more than one layer of seals, each seal being nested in an adjacent seal. In this manner, one of the nested seals can be removed to accommodate sealing against pipes of different diameters.

The inserted pipe 17 may also press against one or more winged extensions 22 of a seal pressing device 24, which is described in US Patent 9151419. The winged extensions 22 press against the axial edges of annular seal 12, thereby ensuring a fluid-tight seal along the axial length of seal 12.

Reference is now made additionally to FIGS. 3 and 4. A plurality of grip elements 26 are located about the inner perimeter of opening 16 of housing 14. Each grip element 26 includes a static wedge 28, which is fixed to annular clamp housing 14, such as by fasteners 30 (e.g., screws, rivets and the like). Static wedge 28 may be made of metal or plastic, for example. Static wedge 28 may be mounted on a rigid base 32 (e.g., made of stainless steel or other suitable material) fixed to housing 14, as seen in FIG. 1, or alternatively may be directly mounted on annular clamp housing 14, as seen in FIG. 4.

Each grip element 26 also includes a movable wedge 34, which may be made of metal or plastic, for example. Movable wedge 34 is covered by a grip member 36, which may be made of sheet metal, such as a medium-hardness steel alloy, by stamping or punching or other sheet metal forming processes, or alternatively may be made by machining, casting or metal injection molding (MIM). Grip member 36 has a sloped surface 38 on which teeth 40 are formed. Grip member 36 may be provided with an array of large and small gripping teeth 40, and the teeth 40 may be oriented to bite into the surface of the pipe in different directions. The sharp edges of all teeth 40 face outwards. The large teeth project outwards further than the small teeth. The small teeth may be shaped as a cluster of pointed barbs, whereas the large teeth may be shaped as oval grater barbs; other shapes may also be used.

Movable wedge 34 (along with grip member 36) is arranged to slide over static wedge 28 in the axial direction (i.e., in the direction of the axial length of annular clamp housing 14), indicated by double arrow 35 in FIG. 4. The axial movement causes movable wedge 34 to wedge against the pipe 17 (FIG. 2) and teeth 40 to bite into the surface of the pipe 17, thereby providing an axial restraint against axial forces operating on pipe 17. Movable wedge 34 includes a retaining member 42, which limits the axial travel of movable wedge 34 and which prevents movable wedge 34 from sliding off static wedge 28. Retaining member 42 may be a pin which is constrained to travel in a groove 44 formed in static wedge 28. The ends of groove 44 define the limits of axial travel of retaining member 42. The pin may be made of metal and may be connected to grip member 36. More than one pin and groove may be used as necessary. A biasing member 46, such as a coil spring, elastomeric band and the like, may be located in groove 44 to urge retaining member 42 back to its initial position.

The entire movable wedge 34 including grip member 36 and retaining member 42 may be made as one piece, such as by MIM.

What is claimed is:

1. A pipe coupling comprising:
   an annular seal disposed in an annular clamp housing, which has an opening for inserting therein a pipe and which comprises clamp members and tightening elements operative to fasten and tighten said clamp members towards each other in a direction transverse to an axial length of said annular clamp housing so as to apply a radially-inward clamping force on the pipe; and
   a plurality of grip elements located about an inner perimeter of said opening, each of said grip elements comprising a static wedge, which is fixed to said annular clamp housing, and a movable wedge, which is covered by a grip member having gripping teeth, arranged to slide axially relative to said static wedge, wherein said movable wedge comprises a retaining member, which limits axial travel of said movable wedge and wherein said retaining member is constrained to travel in a groove formed in said static wedge.

2. The pipe coupling according to claim 1, wherein said static wedge is mounted on a rigid base fixed to said annular clamp housing.

3. The pipe coupling according to claim 1, wherein said static wedge is mounted directly on said annular clamp housing.

4. The pipe coupling according to claim 1, further comprising a biasing member located in said groove and arranged to urge said retaining member to an initial position.

* * * * *